Patented Sept. 11, 1934

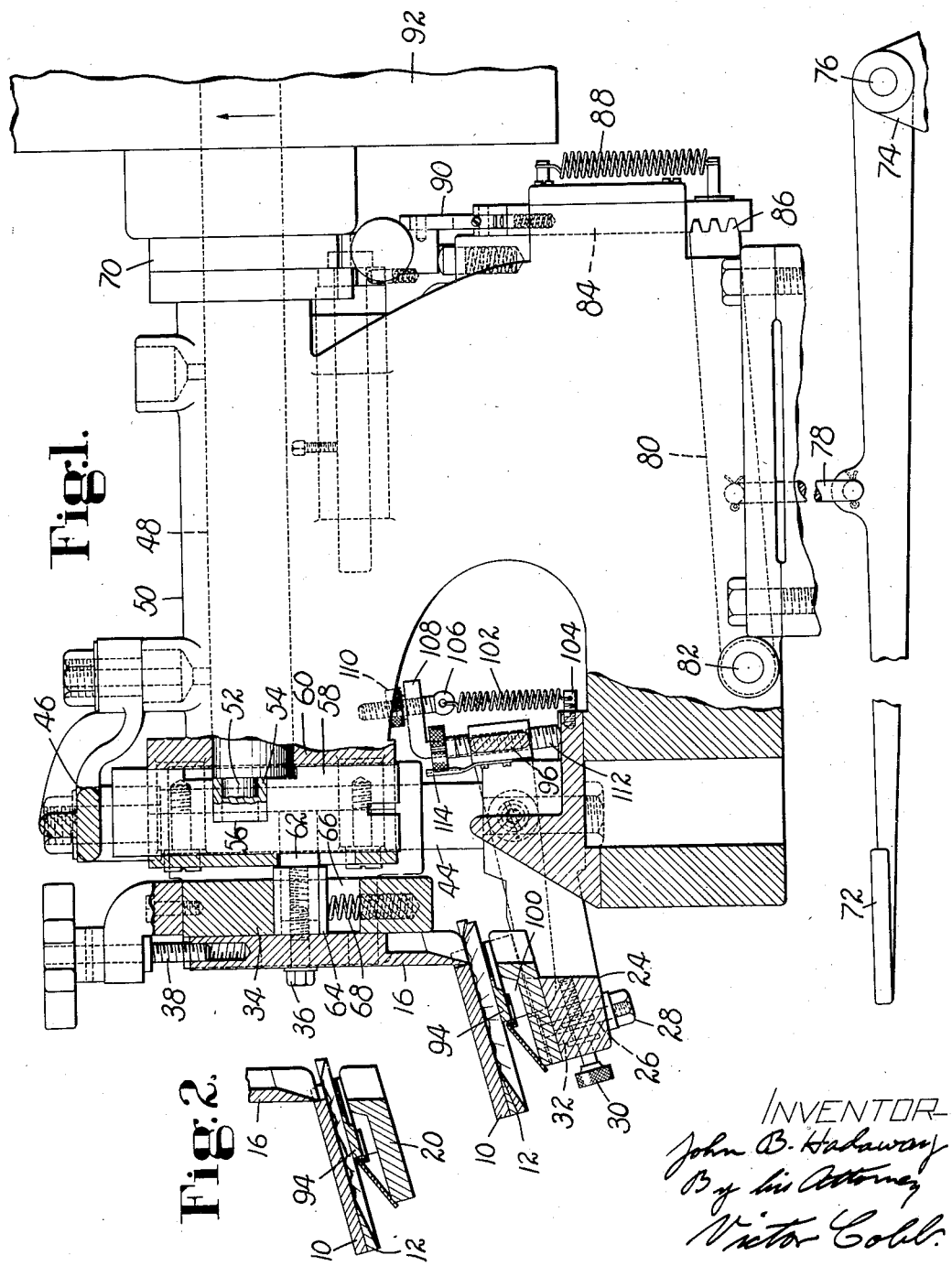

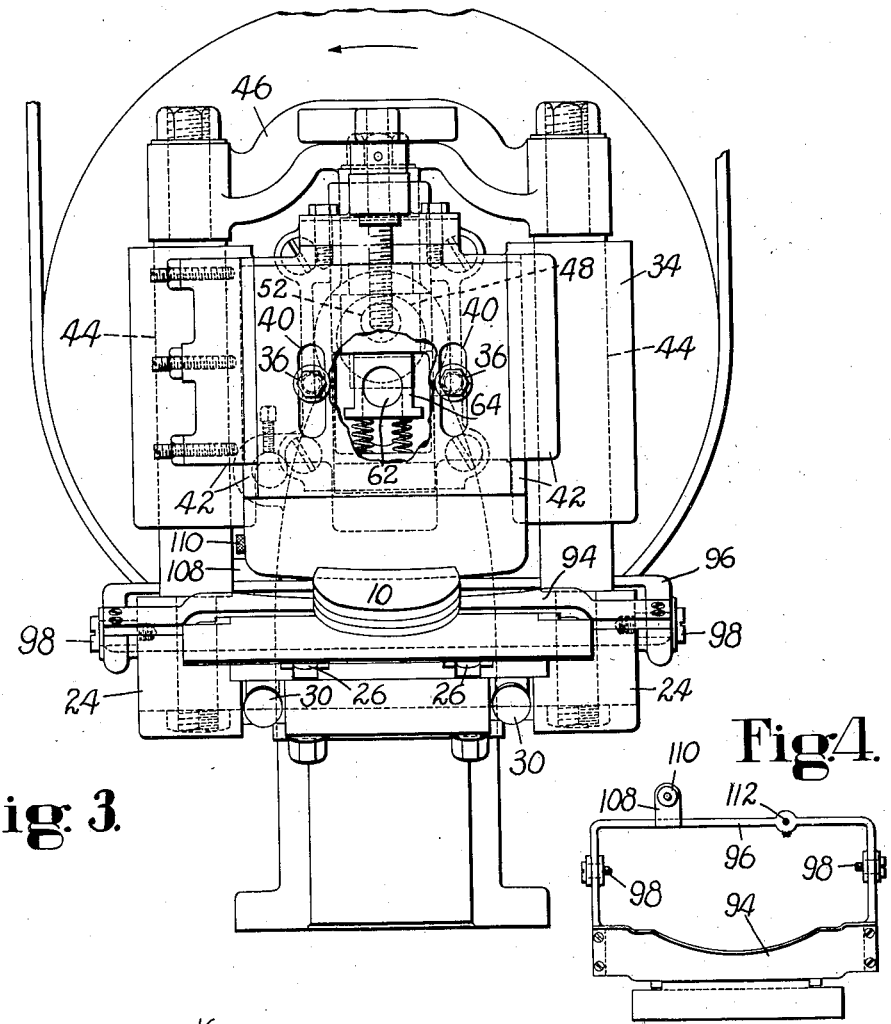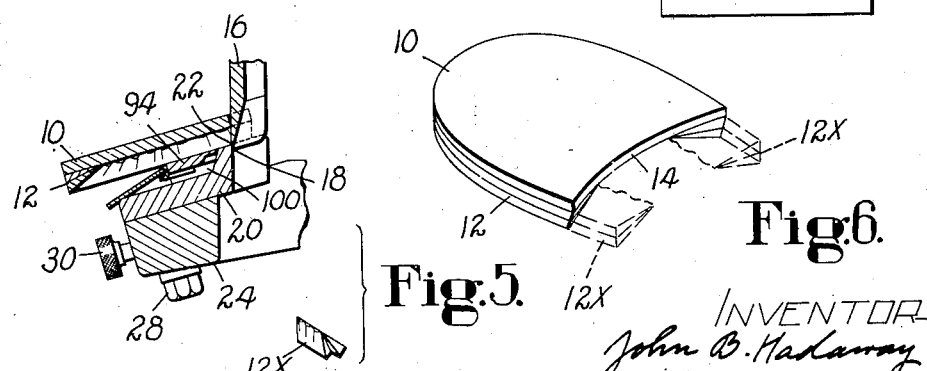

1,973,065

UNITED STATES PATENT OFFICE 1,973,065

TRIMMING MACHINE

John B. Hadaway, Swampscott, Mass., assignor to United Shoe Machinery Corporation, Paterson, N. J., a corporation of New Jersey Application July 19, 1932, Serial No. 623,440

3 Claims. (Cl. 12—50)

This invention relates to trimming machines and is herein disclosed as embodied in a machine of the type in which a reciprocatory cutter operates against a cutting-bed. The invention consists in certain novel features designed to facilitate severing one or more layers of material secured to but projecting beyond another layer, as, for example, severing the projecting ends of a rand attached to a heel-base or lift. It will be appreciated, however, that the construction herein illustrated is not limited to the type of work particularly mentioned herein.

In the manufacture of shoes provided with rubber heels, it is customary to attach a heel-base to the sole of a shoe before attaching a rubber heel, the heel-base being arranged to lie between the sole and the heel of the finished shoe. For this purpose a heel-base of substantially final configuration is provided with a rand prior to being attached to a shoe. It is common to make these heel-bases and rands of leather and to use an adhesive cement to connect them. The rands are made of strips of various lengths, and are bent edgewise to conform their thicker edges to the outline of the sides and backs of the heel-bases to which they are attached, the ends of the rands commonly projecting, at that stage, beyond the breast-faces of the base-pieces. Thereafter, but before these composite heel-base units are attached to shoes, the projecting ends of the rands require to be severed flush with the breast-faces of the base-pieces.

Some rands and some lifts used in the manufacture of heel-bases are no thicker than ⅛ inch and some are more than ¼ inch thick, since at this stage of manufacture they have not been compressed. Consequently, the over-all thicknesses of these composite units differ by as much as ¼ inch, which is more than the thickness of the thinner rands and the thinner lifts. These differences in thickness create a problem with regard to presenting every unit, irrespective of its component thicknesses, so accurately in relation to a trimming cutter as to insure severing the ends of its rand flush with the breast-face of the lift or base.

Accordingly, an object of the invention is to provide an improved trimming machine by which the above-described operation may be performed rapidly and with certainty, to the end that no skill on the part of the operator will be required to insure flush trimming of the rand-ends or to avoid accidentally cutting the lifts.

To this end, and in accordance with one feature of the invention, the illustrated trimming machine comprises an upper member and a lower member, one of which is movable toward and from the other and one of which has a work-positioning face provided with a cutting edge arranged to cut against the other, a downwardly yieldable table arranged normally to support a work-piece at a level that will enable a shoulder thereof to abut the work-positioning face having the cutting edge while an element of the work-piece projecting laterally from the shoulder intersects the path of the movable member, and manually controllable means for operating the movable one of the members to sever such laterally projecting element.

As herein illustrated, the machine is organized to operate on heel-base units laid rand-side down, and the yieldable work-supporting table is provided with means for adjusting it to a level that will enable it to function properly without being manually depressed except when supporting a work-piece having a rand considerably thicker than the average.

Although no skill is required to accomplish the desired result with the combination of elements above defined, nevertheless, to guard against severing a heel-base that might, under certain circumstances, be accidentally or unintentionally advanced into the path of the movable cutting member while the yieldable table is depressed, the invention also provides a yieldable connection in the power-operated mechanism, whereby the penetrative power of the cooperative cutting members is limited in accordance with a resistant characteristic of the work. Specifically, when the machine is to be used for the particular purpose above described, the yieldable connection will have sufficient power to operate the movable cutting member when the two rand-ends are in position to be severed, but will not have sufficient power to cause severance of the lift, since much greater power would be required to sever the latter than the former.

Referring to the drawings,

Fig. 1 is a side elevation, partly in vertical section, of a trimming machine constructed in accordance with this invention, portions of the treadle mechanism and of the column for supporting the head being broken out to save space on the drawings;

Fig. 2 corresponds to a portion of Fig. 1 but represents a work-piece of which the lift and the rand are both thinner than those in Fig. 1.

Fig. 3 is a front elevation of the head, a portion of the cutter-slide being broken out to expose the yieldable connection for operating it;

Fig. 4 is a top-plan view on a smaller scale of the yieldable work-support;

Fig. 5 is a vertical section including portions of the cutter, the cutting bed, and a work-piece, the cutting stroke having been completed and a portion of the work-piece having been severed; and Fig. 6 is a perspective view of a work-piece comprising a heel-base or lift and a rand secured thereto, broken lines representing the projecting ends of the rand before they are severed.

A typical work-piece as represented in the drawings comprises a flat lift or heel-base 10 of leather and a rand 12 secured thereto by an adhesive cement. When work-pieces of this character are assembled, the ends 12x of the rand commonly project beyond the shoulder formed by the breast-face 14 of the heel-base and require to be severed flush with that shoulder after the adhesive cement has dried and preferably before the composite unit has been attached to a shoe. Although the breast-face 14 in the illustrated example is incurved, the corresponding faces of many heel-base lifts are straight, this feature of configuration being determined according to whether the rubber heel to be attached to the heel-base will have an incurved breast-face or a straight breast-face.

The trimming machine herein illustrated is provided with a cutter 16, the front face of which is outcurved to conform to the incurved breast-faces 14 of work-pieces of the type illustrated in Fig. 6, but when the machine is to be used for operating on work-pieces having straight breast-faces the cutter 16 may be detached from the machine and a corresponding cutter having a flat front face may be substituted for it, to the end that whatever characteristic of configuration the breast-faces 14 may have the cutter for severing the ends 12x of the rand may sever them flush with the breast-face beyond which they project.

The lower edge of the cutter 16 is acute to provide a sharp cutting edge 18. This edge is on its front face, and is arranged to cooperate with a cutting bed 20 to sever the rand-ends 12x. The upper cutting member 16 and the lower cutting member 20 are relatively movable one toward and from the other, though preferably, as herein illustrated, the lower member is fixed and the upper member is movable. Moreover, to insure clean cutting and durability, the cutting bed 20 is preferably made of steel and provided with a cutting edge 22 shaped to conform to the cutting edge 18 and arranged to cooperate with the latter to sever the surplus material with a shearing cut. Accordingly, the cutting bed 20 is adjustably mounted on a rigid support 24 to which it is clamped by bolts 26 that provide for adjusting the cutting bed relatively to the support. The bolts 26 are provided with nuts 28 by which they may be set up tightly to clamp the cutting bed. The support 24 is also provided with two screws 30 by which to adjust the cutting bed, each of these screws, as shown in Fig. 1, being provided with a circumferential groove into which a pin or lug 32 projects from the bottom of the cutting bed.

The cutter 16 is carried by a vertically movable slide 34 to which it is rigidly connected by clamping bolts 36 and an adjusting screw 38, vertical slots 40 (Fig. 3) being formed in the cutter to provide for such adjustment. Moreover, the cutter and the slide are provided with cooperative dove-tail connecting portions 42 to insure rigidity of connection.

The slide 34 is bored to receive two vertical guide-rods or posts 44 on which it slides, the lower ends of these posts being affixed to the support 24 and the upper ends being connected and braced, one by the other, by a cross-piece 46.

Motion for operating the cutter-slide 34 is derived from a shaft 48 journaled in the head or frame 50, but preferably, as hereinafter described, a yieldable operating connection is interposed to limit the penetrative power applied to the cutter. The forward end of the shaft 48 is provided with an eccentric wrist-pin 52 that projects into a rectangular block 54 arranged to slide in a horizontal groove 56 formed in a vertical plunger 58. The plunger is guided in a bearing 60 formed in the frame 50, and its motions up and down are positive. A pin or lug 62 rigidly secured to the plunger 58 and projecting forwardly therefrom extends into a block 64 which occupies a chamber 66 formed in the cutter-slide 34, the depth of the chamber 66 being greater than the corresponding dimension of the block 64 to provide a lost-motion connection. Downward motion of the block 64 is normally communicated to the cutter-slide 34 by a pair of helical compression springs 68, the lower portions of which are arranged in sockets formed in the slide and the upper ends of which bear against the bottom face of the block, the springs being initially in a state of compression when the parts are assembled. The combined forces of the springs 68 are sufficient to insure severing the projecting ends of a rand, but their power is not sufficient to force the cutter through a lift 10. Consequently, if a work-piece is thinner than the initial gap between the cutting edge 18 and the cutting bed 20 (see Fig. 2), and if the lift 10 thereof is placed in the path of the cutter 16, the yieldable connection afforded by the springs 68 will enable the plunger 58 and the block 64 to descend to their lowest limits of travel without severing the lift. On the other hand, if only the projecting ends of the rand are placed in the path of the cutter they will both be severed in accordance with the normal intended operation of the mechanism.

The machine is provided with a one-revolution clutch 70 and with clutch-controlling mechanism arranged to be operated by a treadle 72. The illustrated clutch-controlling mechanism includes means for arresting the rotation of the shaft 48 whenever the eccentric wrist-pin 52 arrives at top center. Since the present invention is not concerned with structural details of the clutch-controlling mechanism it will be sufficient for present purposes to state that each depression of the treadle 72 will cause one cycle of the operating shaft 48 and automatic stopping of the shaft at the completion of that cycle. The treadle 72 is connected to a floor fixture 74 by a pivot pin 76. A rod 78 connects the treadle and a lever 80 mounted in the frame 50 and connected thereto by a pivot pin 82. The lever 80 and a vertically movable plunger 84 arranged to slide in a bearing in the frame 50 are provided with cooperative teeth 86 by which motion is communicated from one to the other. A tension spring 88 normally raises the plunger 84, the lever 80, and the treadle 72. A tripping device 90 carried by the plunger 84 cooperates with other elements by which the shaft 48 is started and stopped as hereinbefore specified. The driving member of the clutch includes a fly-wheel 92 which also serves as a pulley on which a driving belt may run.

To facilitate placing work-pieces successively in the desired relation to the cutter, and to minimize the likelihood of placing the lifts 10 in the path of the cutter, the invention provides a downwardly yieldable table 94 by which a work-piece may be normally supported at a level that will enable the shoulder or breast-face 14 of the lift to abut the front face of the cutter. As shown in Fig. 4 the table 94 is a plate, the ends of which are carried by and affixed to the two arms of a U-shaped frame 96. These arms are arranged on two coaxial pivot studs 98 screwed into opposite sides of the rigid support 24. The plate 94 extends across the cutting bed in front of the shearing edge 22 thereof and may be depressed to a position flush with the cutting bed, the latter being provided with a cavity or depression 100 to provide clearance necessary for that relation, see Fig. 5.

The plate 94 is normally raised by a tension spring 102 (Fig. 1), the lower end of which is attached to an anchoring screw 104 and the upper end to a tension-regulating screw 106 extending through an ear 108 formed on the U-shaped frame 96. The screw 106 is provided with an adjusting nut 110. The initial level of the supporting plate 94 may be regulated by an adjusting screw 112 carried by the frame 96 and arranged to bear downwardly on a portion of the rigid support 24. The frame 96 is also provided with a leaf-spring 114 arranged to engage the head of the adjusting screw 112 to prevent accidental turning thereof.

In practice, the yieldable work-supporting table 94 will be adjusted to stand initially at a level that will enable the shoulder or breast-face 14 of a lift or heel-base to abut the front face of the cutter 16 while the ends 12x of the rand projecting beyond the shoulder intersect the cutting plane between the cutting edge 18 of the cutter and the cutting bed 20 as represented in Figs. 1 and 2.

Preferably, the initial gap between the cutting bed and the cutting edge 18 will be regulated by the adjusting screw 38 to a depth about ⅛ of an inch greater than the thickness of the thickest rand. Then the table 94 will be adjusted by the screw 112 to a level that will enable the thickest rand to clear the cutting edge 18 when this screw is seated against its stop.

The most rapid method of procedure for placing a work-piece to insure flush trimming of the rand-ends 12x is to begin by placing it rand-side down on the table 94 beyond the right side or the left side of the cutter 16; then shifting it sidewise to the middle of the cutter and thereby placing the rand-ends under the cutting edge 18; and finally moving the work-piece toward the rear until the shoulder or breast-face 14 abuts the front face of the cutter 16. This procedure avoids obstruction that might be encountered by attempting to insert the rand-ends lengthwise under the cutter 16, particularly if they curl up or down as they commonly do.

If a work-piece has a rand thicker than the space provided for its reception by the adjustment of the table 94 the latter may be depressed against the force of the spring 102 while shifting the work-piece sidewise from one side toward the middle of the cutter 16. A slight downward pressure of the hand on the work-piece will depress the table. On the other hand, if the table were depressed, acidentally or otherwise, while placing a work-piece comprising a very thin lift and a very thin rand (see Fig. 2) it might happen that the lift 10 would intersect the path of the cutting edge 16 when the cutter descends. Nevertheless, under these conditions the yieldable connections comprising the springs 68, the block 64 and the chamber 66 would become operative to save the lift from being severed. Even though, under such circumstances, the cutting edge 18 may indent or score the lift, the work-piece will not be seriously damaged in consequence thereof because any mark thus scored will subsequently be concealed by a rubber heel that will cover the entire face of the lift.

Having described my invention, what I claim as new and desire to secure by Letters Patent of the United States is:—

1. A trimming machine comprising an upper member and a lower member one of which is movable toward and from the other and one of which is provided with a cutting edge and with a work-positioning face arranged to register a shoulder of a work-piece in flush relation to said cutting edge, a downwardly yieldable table arranged normally to support the work-piece at a level that will enable such shoulder to abut said face while surplus material of the work-piece projecting laterally from said shoulder extends across said cutting edge, and manually controllable means for operating the movable one of said members to sever such laterally projecting material.

2. A trimming machine comprising a cutting-bed, a cutter arranged to cut downwardly against the cutting-bed, a downwardly yieldable table arranged normally to support a work-piece above the cutting-bed and in contiguous relation to the cutter, adjustable means arranged to regulate the upper limit of movement of the table in accordance with a thickness dimension of the work-piece, and manually controllable means for operating the cutter.

3. A trimming machine comprising a cutting-bed, a reciprocatory cutter arranged to cut against said cutting-bed, a yieldable table arranged normally to support a heel-base the lower face of which is provided with a rand at a level such as to enable the breast-face of the heel-base to abut a face of the cutter while the ends of the rand project beyond said breast-face, and power-operated mechanism arranged to operate said cutter, said mechanism including a yieldable connection by which the penetrative power of the cutter is rendered sufficient to sever the projecting ends of the rand but limited to prevent severing the heel-base.

JOHN B. HADAWAY.